United States Patent [19]

Sugiki

[11] Patent Number: 4,750,819

[45] Date of Patent: Jun. 14, 1988

[54] ANAMORPHIC PRISM

[75] Inventor: Mikio Sugiki, Tokyo, Japan

[73] Assignee: Sony Corporation, Tokyo, Japan

[21] Appl. No.: 50,289

[22] PCT Filed: Sep. 5, 1986

[86] PCT No.: PCT/JP86/00451

§ 371 Date: Apr. 27, 1987

§ 102(e) Date: Apr. 27, 1987

[87] PCT Pub. No.: WO87/01467

PCT Pub. Date: Mar. 12, 1987

[30] Foreign Application Priority Data

Sep. 7, 1985 [JP] Japan .................... 60-137054[U]

[51] Int. Cl.$^4$ ............................................. G02B 13/10
[52] U.S. Cl. .................................................. 350/421
[58] Field of Search ....................... 350/421, 168, 286

[56] References Cited

U.S. PATENT DOCUMENTS 4,017,160 4/1977 Betensky ..................... 350/421

Primary Examiner—John K. Corbin
Assistant Examiner—Rebecca D. Gass
Attorney, Agent, or Firm—Hill, Van Santen, Steadman & Simpson

[57] ABSTRACT

This invention relates to an anamorphic prism (11) for correcting an anisotropy of a radiation angle of a beam (14). The anamorphic prism (11) is constituted by a first prism (12) and a second prism (13) so that tha anamorphic prism (11) can have an achromatic structure. Refractive indexes and refractive index changes due to a wavelength fluctuation of the first and second prisms (12, 13), and an incident angle of the beam (14) to the first prism (12) can satisfy a predetermined relationship, and the beam (14) can be emerged from the second prism (13) at an exit angle of 0°. The anamorphic prism of this invention can be applied to an optical head or the like using a semiconductor laser as a light source.

2 Claims, 4 Drawing Sheets $\theta_1 = \phi_1$
$\theta_2 = \eta + \xi_2$
$\eta = (90° - \xi_2)/2$
$\theta_2 = (90° + \xi_2)/2$ $\theta_1 = \phi_1$
$\theta_2 = \eta - \xi_2$
$\eta = 90° - \theta_2$
$\theta_2 = (90° - \xi_2)/2$

ANAMORPHIC PRISM

TECHNICAL FIELD

The present invention relates to an anamorphic prism for correcting an anisotropy in beam radiation angles.

BACKGROUND ART

For example, in an optical head for a programmable optical recording medium, a collimator lens having a high numerical aperture is normally used in order to improve utilization efficiency of a beam. When a semiconductor laser is used as a light source, an anisotropy in beam irradiation angles is generally corrected using an anamorphic prism.

The semiconductor laser causes a wavelength fluctuation $\Delta\lambda$ of 10 to 20 nm due to a change in temperature, output power, and the like, or upon incidence of a return beam from the optical recording medium. A refractive index of the anamorphic prism changes due to the wavelength fluctuation $\Delta\lambda$, and as a result, an angle of an exit beam from the anamorphic prism may be changed. However, the conventional anamorphic prism cannot cope with this respect.

In a conventional anamorphic prism which consists of a single prism using an optical glass SF13 and has an enlargement magnification ratio $\beta \approx 1.7$, if $\Delta\lambda \approx 10$ nm, an exit angle change of $\Delta\xi \approx 0.02°$ occurs. Therefore, when an objective lens having a focal length $f=4.5$ mm is used, a beam spot is shifted by $\Delta x = f \cdot \Delta\xi = 1.5$ $\mu$m in a lateral direction on the optical recording medium.

The wavelength fluctuation of about $\Delta\lambda \approx 10$ nm easily occurs due to various conditions, and cannot be controlled. As a result, it is difficult to perform positional control of the beam spot for a recording or reproducing operation, and a stable and accurate recording or reproducing operation cannot be performed.

DISCLOSURE OF INVENTION

An anamorphic prism according to the present invention comprises a first prism which has a refractive index of $n_1$, a refractive index change of $\Delta n_1$ due to a wavelength fluctuation, and a vertex angle of $\theta_1$, and a second prism which has the refractive index of $n_2$, the refractive index change of $\Delta n_2$, and a vertex angle of $\theta_2$, and is bonded to the first prism. If an incident angle on the second prism of the beam that is incident on the first prism at an incident angle $\phi_1$ is given as $\phi_2$ and the incident angle $\phi_2 <$ the vertex angle $\phi_1$, the first and second prisms and the incident angle $\phi_1$ satisfy the following relation:

$$(\Delta n_2/\Delta n_1)\cdot(n_1/n_2) > n_1^2/(n_1^2-\sin^2\phi_1)$$

If the incidence angle $\phi_2 >$ the vertex angle $\theta_1$, they satisfy:

$$(\Delta n_2/\Delta n_1)\cdot(n_1/n_2) < n_1^2/(n_1^2-\sin^2\phi_1)$$

In addition, the beam is emerged from the second prism at an exit angle of 0° with respect to the vertex angle $\theta_2$.

With this structure, the anamorphic prism according to the present invention has no dependency with respect to a wavelength, and can have an achromatic structure.

For this reason, when the anamorphic prism according to the present invention is applied to an optical head in which a semiconductor laser is used as a light source and which is used for a recording or reproducing operation of information with respect to an optical recording medium such as an optical disk, even if a wavelength fluctuation occurs in the semiconductor laser due to a change in temperature, output power or the like of the semiconductor laser or upon incidence of the return beam from the optical recording medium, an angle of a beam emerged from the anamorphic prism will not be changed. Therefore, even if the wavelength fluctuation occurs, the irradiation beam spot cannot be fluctuated on the optical recording medium, and a stable and accurate recording or reproducing operation can be performed.

BEST MODE OF CARRYING OUT THE INVENTION

First to fourth embodiments of the present invention will now be described. Prior to the description of these embodiments, the principle of the present invention will now be described with reference to FIGS. 1 and 2.

Figure 1:
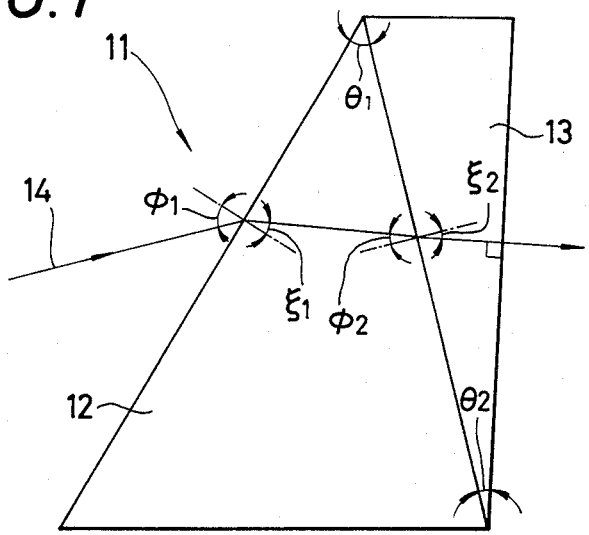
FIGS. 1 and 2 are side views for explaining the principle of the present invention, respectively.
Figure 2:
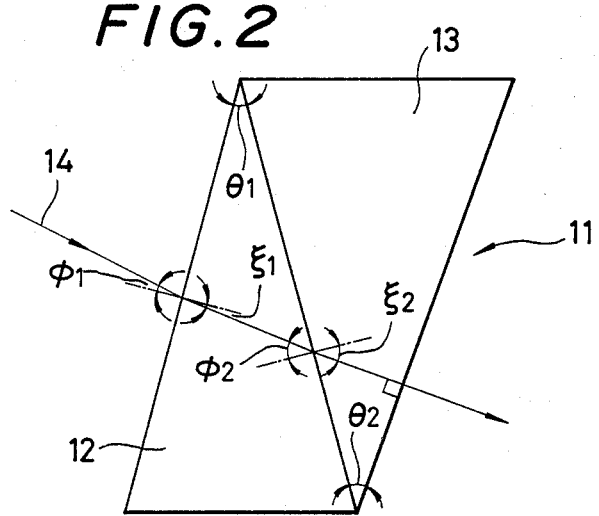
Figure 3:
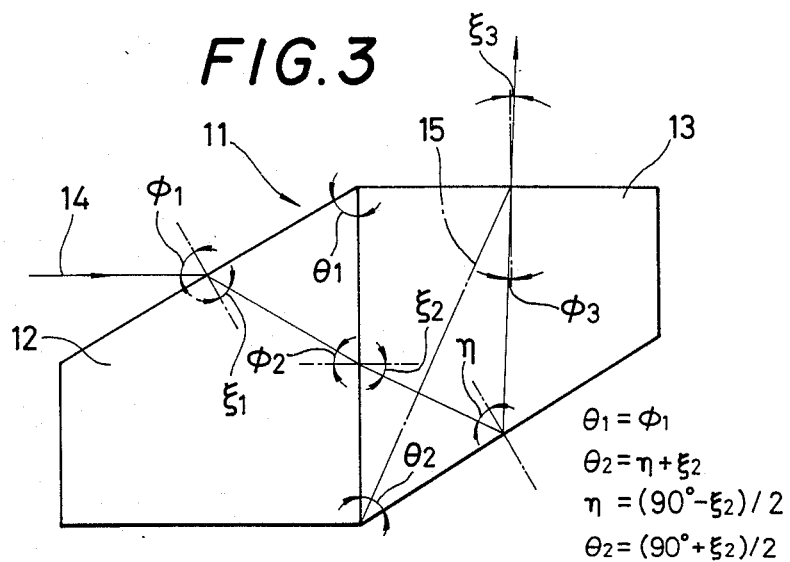
FIGS. 3 to 6 are side views showing first to fourth embodiments of the present invention.
Figure 4:
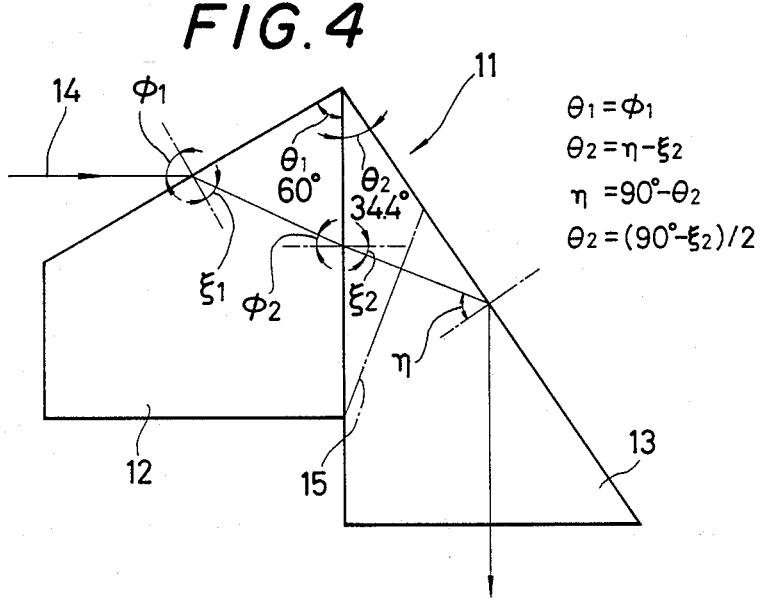
Figure 5:
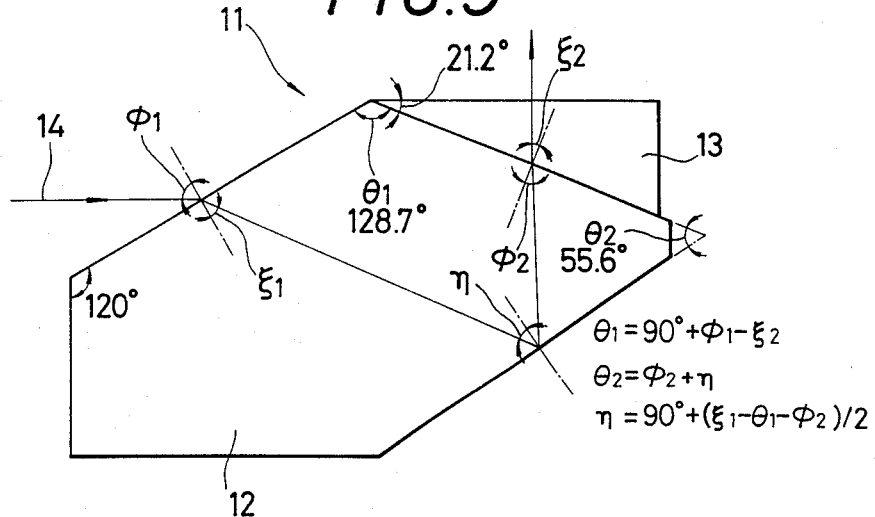
Figure 6:
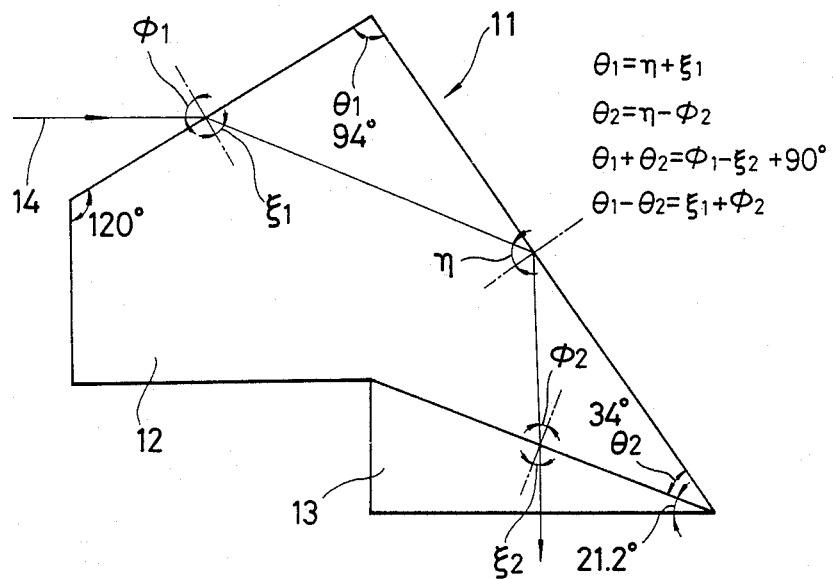

In each of anamorphic prisms 11 in FIGS. 1 and 2, first and second prisms 12 and 13 respectively having vertex angles $\theta_1$ and $\theta_2$ are bonded to each other.

The first prism 12 has a refractive index $n_1$ with respect to light having a wavelength $\lambda$, and a refractive index change $\Delta n_1$ due to a wavelength fluctuation $\Delta\lambda$. The second prism 13 similarly has a refractive index $n_2$ and a refractive index change $\Delta n_2$.

If incident angles and refraction angles of a beam 14 having a wavelength $\lambda$ incident on each anamorphic prism 11 at the prisms 12 and 13 are respectively given as $\phi_1$, $\xi_1$, $\phi_2$ and $\xi_2$, the following equations are established:

$$\sin\phi_1 = n_1 \cdot \sin\xi_1 \quad \text{(1)}$$

$$n_1 \cdot \sin\phi_2 = n_2 \cdot \sin\xi_2 \quad \text{(2)}$$

In the case of FIG. 1, the following equation is established:

$$\phi_2 = \theta_1 - \xi_1 \quad \text{(3)}$$

In the case of FIG. 2, the following equation is established:

$$\phi_2 = \phi_1 + \xi_1 \quad \text{(3)}'$$

When the wavelength of the beam 14 fluctuates to $\lambda + \Delta\lambda$, equation (1) is rewritten as:

$$\sin\phi_1 = (n_1 + \Delta n_1) \cdot \sin(\xi_1 + \Delta\xi_1)$$

however, since both $\Delta n_1$ and $\Delta\xi_1$ are small, if this equation is developed and is substituted with an approximate expression, and terms of second degree or higher are 0, this equation can be:

$$\sin\phi_1 n_1 \cdot \sin\xi_1 + n_1 \cdot \Delta\xi_1 \cdot \cos\xi_1 + \Delta n_1 \cdot \sin_1$$

Therefore, from this equation and equation (1), the following equation can be obtained:

$$\Delta\xi_1 = -(\Delta n_1/n_1)\cdot\tan\xi_1 \quad (4)$$

Even if the wavelength of the beam 14 fluctuates to $\lambda+\Delta\lambda$, the vertex angle $\theta_1$ is left unchanged. Therefore, from equations (3) and (3)', equations (3) and (3)' can be written as follows:

$$\phi_2+\Delta\phi_2 = \theta_1-(\xi_1+\Delta\xi_1)$$

$$\phi_2+\Delta\phi_2 = \theta_1+(\xi_1+\Delta\xi_1)$$

Therefore, these equations and equations (3) and (3)' derive the following equations:

$$\Delta\phi_2 = -\Delta\xi_1 \quad (3)$$

$$\Delta\phi_2 = \Delta\xi_1 \quad (5)$$

When the wavelength of the beam 14 fluctuates to $\lambda+\Delta\lambda$, equation (2) can be expressed as:

$$(n_1+\Delta n_1)\cdot\sin(\phi_2+\Delta\phi_2) = (n_2+\Delta n_2)\cdot\sin(\xi_2+\Delta\xi_2)$$

However, if the refraction angle $\xi_2$ does not have a wavelength dependency, since $\Delta\xi_2=0$, this equation can be rewritten as:

$$(n_1+\Delta n_1)\cdot\sin(\phi_2+\Delta\phi_2) = (n_2+\Delta n_2)\cdot\sin\xi_2$$

Therefore, if this equation is developed and substituted with an approximate expression, terms of second orders or higher are 0, and equation (2) is used, this can yield:

$$\Delta\phi_2 = \{(\Delta n_2/n_2)-(\Delta n_1/n_1)\}\cdot\tan\phi_2 \quad (6)$$

If equation (5) or (5)', equation (4) and equation (3) or (3)' are used for equation (6), this can yield:

$$\tan\xi_1 = \{(\Delta n_2/\Delta n_1)\cdot(n_1/n_2)-1\}\cdot\tan(\theta_1-\xi_1) \quad (7)$$

$$\tan\xi_1 = \{1-(\Delta n_2/\Delta n_1)\cdot(n_1/n_2)\}\cdot\tan(\theta_1+\xi_1) \quad (7)'$$

Equation (7) is developed as:

$$\{\tan^2\xi_1+1-(\Delta n_2/\Delta n_1)\cdot(n_1/n_2)\}\cdot\tan\theta_1 = -(\Delta n_2/\Delta n_1)\cdot(n_1/n_2)\cdot\tan\xi_1$$

Since, $$\tan^2\xi_1 + 1 = 1/\cos^2\xi_1 = 1/(1-\sin^2\xi_1)$$
$$= 1/\{1-(\sin^2\phi_1/n_1^2)\}$$
$$= n_1^2/(n_1^2-\sin^2\phi_1)$$

Then, $$\tan\theta_1 = \{(\Delta n_2/\Delta n_1)\cdot(n_1/n_2)\cdot\tan\xi_1\}$$
$$/\{(\Delta n_2/\Delta n_1)\cdot(n_1/n_2)$$
$$- n_1^2/(n_1^2-\sin^2\phi_1)\}$$

Equation 7' can be developed as:

$$\tan\theta_1 = \{(\Delta n_2/\Delta n_1)\cdot(n_1/n_2)\cdot\tan\xi_1\}$$
$$/[\{n_1^2/(n_1^2-\sin^2\phi_1)\}$$
$$- (\Delta n_2/\Delta n_1)\cdot(n_1/n_2)]$$

In either of equations (8) and (8)', since the left-hand side and the numerator of the right-hand side are positive, the denominator of the right-hand side must be positive.

As shown in FIGS. 1 and 2, if the vertex angle $\theta_2$ is selected so that the beam is emerged from the prism 13 at the exit angle of 0°, the exit angle does not depend on the wavelength of the beam 14.

Therefore, if the anamorphic prisms 11 are designed to have the achromatic structure and if the incident angle $\phi_2<$ the vertex angle $\phi_1$, as shown in FIG. 1, the following relation must be satisfied:

$$(\Delta n_2/\Delta n_1)\cdot(n_1/n_2) > n_1^2/(n_1^2-\sin^2\phi_1)$$

If the incident angle $\phi_2>$ the vertex angle $\theta_1$, as shown in FIG. 2, the following relation must be satisfied:

$$(\Delta n_2/\Delta n_1)\cdot(n_1/n_2) < n_1^2/(n_1^2-\sin^2\phi_1)$$

First to fourth embodiments of the present invention will now be described with reference to FIGS. 3 to 7. In any of these embodiments, the anamorphic prism 11 consists of the first prism 12 using an optical glass BK7 and the second prism 13 using an optical glass SF11.

The optical glass BK7 has a refractive index $n_1=1.5112$ with respect to light having a wavelength $\lambda$ of 780 nm, and a refractive index change $\Delta n_1=0.0002$ due to the wavelength fluctuation $\Delta\lambda=10$ nm. The optical glass SF11 has a refractive index $n_2=1.7660$, and a refractive index change $\Delta n_2=0.0006$.

In any embodiment, not only the anamorphic prism 11 has the achromatic structure, but also a reflection surface is provided to the prism 12 or 13 so that the beam incident and exit directions are perpendicular to each other so as to realize a compact optical head.

In any of the first to fourth embodiments, the incident direction of the beam 14 is oriented from the left to the right in the corresponding drawing. In the first embodiment shown in FIG. 3, in order to orient the exit direction from downward to upward in the drawing, the reflection surface is provided to the second prism 13. In the second embodiment shown in FIG. 4, in order to orient the exit direction from upward to downward in the drawing, the reflection surface is provided to the second prism 13. In the third embodiment shown in FIG. 5, in order to orient the exit direction from downward to upward in the drawing, the reflection surface is provided to the first prism 12. In the fourth embodiment shown in FIG. 6, in order to orient the exit direction from upward to downward in the drawing, the reflection surface is provided to the first prism 12.

Therefore, in the first and second embodiments, if each second prism 13 has a plane 15 perpendicular to the beam 14, these anamorphic prisms 11 can have at least the achromatic structure.

Figure 7:
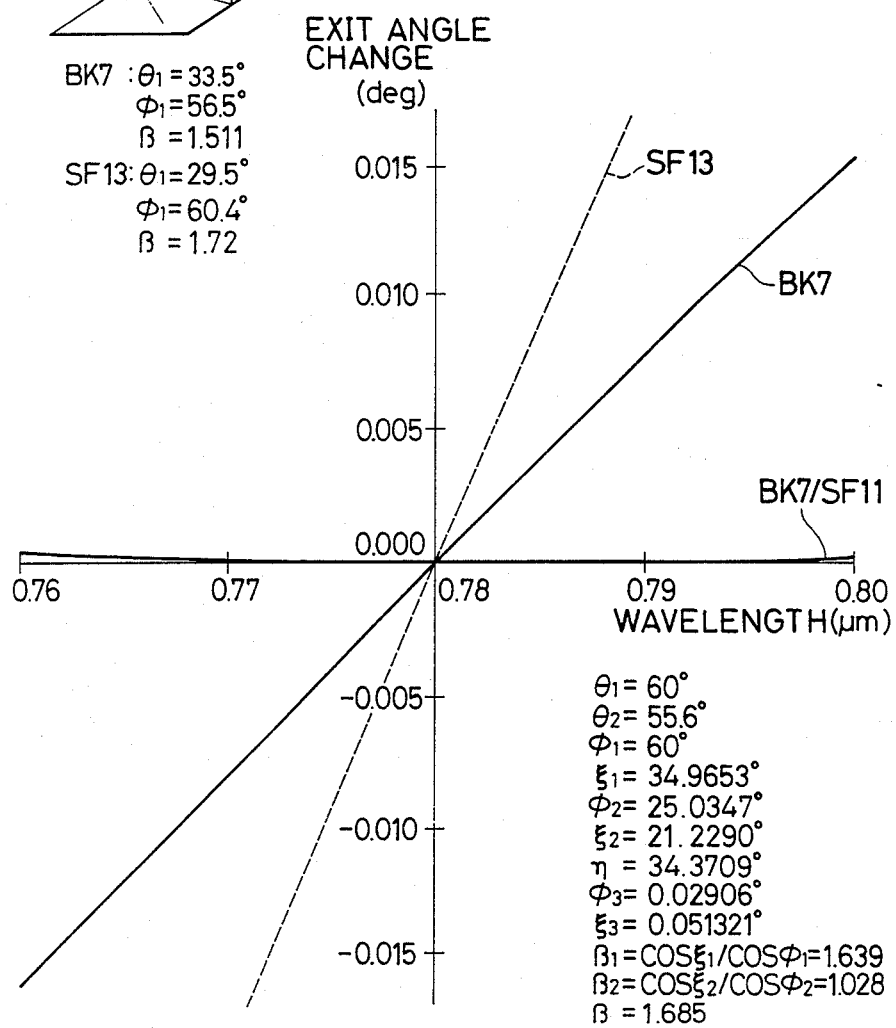
FIG. 7 is a graph showing the relationship between a wavelength and an exit angle change in the first embodiment and the two prior arts of the present invention.

FIG. 7 shows the relationship between a wavelength and an exit angle change in conventional prisms which respectively have parallelogram-shaped side surfaces and respectively comprise only the optical glass BK7 or the optical glass SF13 and in the first embodiment.

As is apparent from FIG. 7, in the first embodiment, the exit angle has almost no dependency with respect to the wavelength, and the prism of the first embodiment has a substantially completely achromatic structure.

Industrial Applicability

The present invention can be applied to an optical head or the like in which a semiconductor laser is used as a light source and which is used for recording or reproducing information on or from an optical recording medium such as an optical disk. The optical head employing the present invention does not cause a disposition of a radiation beam spot on the optical recording medium even if the wavelength fluctuation occurs in the semiconductor laser, and a stable and accurate recording or reproducing operation can be performed.

I claim:

1. An anamorphic prism comprising:

a first prism which has a refractive index of $n_1$, a refractive index change of $\Delta n_1$ due to a wavelength fluctuation, and a vertex angle of $\theta_1$, and a second prism which has the refractive index of $n_2$, the refractive index change of $\Delta n_2$, and a vertex angle of $\theta_2$, and is bonded to said first prism, wherein if an incident angle on the second prism of a beam that is incident on the first prism at an incident angle $\phi_1$ is given as $\phi_2$, when the incident angle $\phi_2$ is less then the vertex angle $\phi_1$, said first and second prisms and the incident angle $\phi_1$ satisfy:

$$(\Delta n_2/\Delta n_1)\cdot(n_1/2) > n_1^2/(n_1^2 - \sin^2\phi_1)$$

when the incidence angle $\phi_2$ is greater than the vertex angle $\theta_1$, they satisfy:

$$(\Delta n_2/\Delta n_1)\cdot(n_1/n_2) < n_1^2/(n_1^2 - \sin^2\phi_1)$$

and, the beam is emerged from said second prism at an exit angle of 0° with respect to the vertex angle $\theta_2$.

2. An anamorphic prism according to claim 1, characterized in that said anamorphic prism is applied to an optical head having a semiconductor laser as a light source, the beam being emitted from said semiconductor laser.

* * * * *